(No Model.)

C. W. HUNT.
CONVEYING APPARATUS.

No. 442,976. Patented Dec. 16, 1890.

Witnesses:
J. Staib
Chas. H. Smith

Inventor:
Charles W. Hunt
per Lemuel W. Serrell
Atty.

UNITED STATES PATENT OFFICE.

CHARLES W. HUNT, OF WEST NEW BRIGHTON, NEW YORK.

CONVEYING APPARATUS.

SPECIFICATION forming part of Letters Patent No. 442,976, dated December 16, 1890.

Application filed September 12, 1890. Serial No. 364,763. (No model.)

*To all whom it may concern:*

Be it known that I, CHARLES W. HUNT, a citizen of the United States, residing at West New Brighton, in the county of Richmond and State of New York, have invented an Improvement in Conveying Apparatus for Coal, Ore, &c., of which the following is a specification.

Coal, ore, and similar materials have been transported from place to place by buckets connected by chains and supported by rollers running upon elevated tracks. A device of this kind may be seen in Letters Patent granted to me May 27, 1890, No. 428,916. In conveyers of this character there is a space between one bucket and the next, and if the coal-supply is continuous the material is scattered by passing between one bucket and the next, and to prevent this scattering of the material the feed has been regulated by a rotary measure such as shown in the said patent.

The present invention is for dispensing with any cut-off or rotary measure, and for allowing the supply to run continuously from a spout or hopper, and for insuring the proper discharge of the material into the buckets only. With this object in view I make use of a range of covering-plates moving along with the buckets above the space between one bucket and the next, and coal or other material that might fall between the buckets is received upon these covering-plates, and as the parts move along such material is tipped off each covering-plate in succession into the adjoining bucket, and the covering-plates are preferably connected with an endless belt or chain moving in harmony with the chain of buckets.

Figure 1:
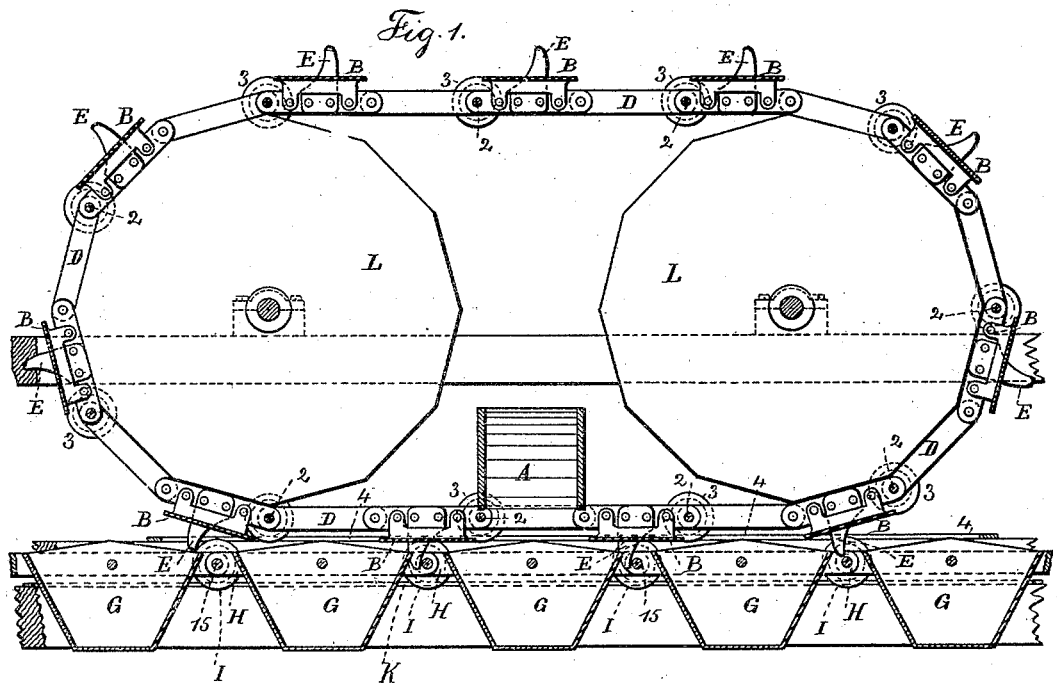
Figure 2:
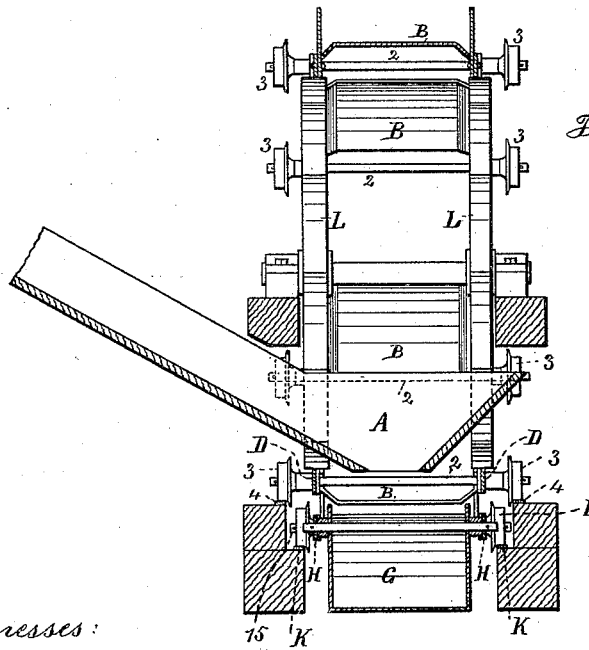

In the drawings, Figure 1 is a sectional elevation representing the chain of conveyer-buckets, the covering-plates, and the chain with which they are connected; and Fig. 2 is a cross-section at the supply-chute.

The range of buckets is to be of any desired character. I have shown buckets G connected together by the chains H, which chains are provided with cross-rods 15, forming axles for the wheels I upon the tracks K, and this range of buckets and the supporting-chains are moved along progressively by any suitable power.

The coal or other material is supplied from a hopper or chute A, which is to be of any desired character, and the mouth or opening of the same is directly over the buckets G, and it will now be apparent that where the supply is continuous from the chute A the coal or other material will drop or be scattered between one bucket and the next if no provision is made for covering up such opening.

The covering-plates B are of a size sufficient to extend from one bucket to the other above the opening between each two buckets, and these covering-plates may be flat, or, by preference, the outer edges are turned up adjacent to the chain D, which chain is formed of links with cross-shafts 2 and rollers or wheels 3 upon the tracks 4, and these covering-plates and their chains move along in unison with the chains of conveyer-buckets, and as a convenient means for giving motion to the chain D and covering-plates I provide the downwardly-projecting arms E, against which the cross-shaft 15 or any other convenient portions of the chain of buckets act to move along such chain D and conveyer-plates, with the plates above the openings between the buckets, and the chain D should be endless and pass around suitable drums L near the hopper or chute A, and it will be apparent that as the parts move along the advancing edges of the covering-plates are raised with the chains in passing around the drums L, and in so doing the coal or other material that may have lodged upon the upper surfaces of the covering-plates are discharged into the bucket that is immediately below the lower edge of such covering-plate, thus preventing the coal being scattered and allowing for a continuous supply to the chain of buckets moving along beneath the supply chute or hopper.

It is not necessary to provide cylinders or wheels for the chain of covering-plates, as the rollers or wheels of the chain may run upon stationary tracks curved at the ends.

I claim as my invention—

1. The combination, with a conveyer having buckets connected together and moving along progressively, of covering-plates above the openings between the respective buckets, means for connecting the covering-plates and moving them along progressively with the buckets and beneath the supply chute or hopper, and means for raising one end of each covering-plate to tip the material that may rest upon such covering-plate into one of the buckets, substantially as set forth.

2. The conveyer-buckets, connecting-chains, and track, in combination with a supply chute or hopper and a series of covering-plates connected together and moving along with the buckets and covering the openings between the respective buckets, substantially as set forth.

3. The covering-plate B, having arms extending therefrom through which motion is received, the chain D, drums around which the chains and covering-plates pass, wheels 3, and tracks 4 for supporting such covering-plates, in combination with the buckets, the chains for connecting the same, the supporting-wheels I, and tracks K, substantially as set forth.

Signed by me this 9th day of September, A. D. 1890.

CHAS. W. HUNT.

Witnesses:
HAROLD SERRELL,
WILLIAM G. MOTT.